United States Patent
Wan

[19]

[11] Patent Number: 5,852,620

[45] Date of Patent: Dec. 22, 1998

[54] TUNABLE TIME PLATE

[75] Inventor: Chaozhi Wan, Arcadia, Calif.

[73] Assignee: Uniwave Technology, Inc., Chatsworth, Calif.

[21] Appl. No.: 784,767

[22] Filed: Jan. 16, 1997

[51] Int. Cl.[6] ........................................ H01G 3/10
[52] U.S. Cl. ........................ 372/22; 372/25; 372/27; 372/105; 372/700
[58] Field of Search ................ 372/25, 22, 700, 372/27, 105, 92

[56] References Cited

U.S. PATENT DOCUMENTS

| | | |
|---|---|---|
| 4,880,996 | 11/1989 | Peterson et al. . |
| 4,884,276 | 11/1989 | Dixon et al. . |
| 4,961,195 | 10/1990 | Skupsky et al. . |
| 5,065,046 | 11/1991 | Guyer . |
| 5,117,126 | 5/1992 | Geiger . |
| 5,123,022 | 6/1992 | Ebbers et al. . |
| 5,144,630 | 9/1992 | Lin . |
| 5,181,212 | 1/1993 | Moberg . |
| 5,206,868 | 4/1993 | Deacon . |
| 5,274,650 | 12/1993 | Amano . |
| 5,278,852 | 1/1994 | Wu et al. . |
| 5,363,192 | 11/1994 | Diels et al. . |
| 5,420,875 | 5/1995 | Sternklar ........................... 372/27 |
| 5,590,148 | 12/1996 | Szarmes ........................... 372/105 |
| 5,671,232 | 9/1978 | Lee et al. ........................... 372/27 |

OTHER PUBLICATIONS

Jones et al; "Multiwatt–Level 213 nm Source Based on a Repetitively Q–Switched CW–Pumped ND:YAG Laser"; IEEE Jour. of Quantum Electronics;vol. QE–15,No.4,Apr. 1979.

Pixton; "Tripling yag frequency"; Laser Focus;pp. 66–70.

*Primary Examiner*—Leon Scott, Jr.
*Attorney, Agent, or Firm*—Thomas I. Rozsa; Tony D. Chen; Jerry Fong

[57] ABSTRACT

A tunable time plate device for providing a continually adjustable time delay between two linearly polarized laser pulses $\omega_1$ and $\omega_2$. The device comprises a time plate made of a parallel flat birefringence crystal having a principal axis of refractive index $n_z$ parallel to its surface, and a principal axis of refractive index $n_x$ having an angle $\phi$ to its surface normal. The time plate is rotatably mounted such that it is rotatable about its $n_z$ principal axis for tuning a time delay between the two laser pulses as they travel through the time plate which is a function of an incident angle $\theta$ between its surface normal and the propagation direction of the laser pulses. The time delay therefore can be continually adjusted by rotating said time plate to change said incident angle $\theta$.

20 Claims, 4 Drawing Sheets

5,852,620

TUNABLE TIME PLATE

BACKGROUND OF THE INVENTION

1. Field of The Invention

The present invention generally relates to the field of a time delay device in pulsed laser apparatus. More particularly, the present invention relates to the field of a time delay device in pulsed laser apparatus which can continually adjust the time delay between two picosecond and/or femtosecond laser pulses.

2. Description of The Prior Art

The following twelve (12) prior art references are pertinent to the field of art of the present invention:

1. U.S. Pat. No. 4,880,996 issued to Peterson et al. on Nov. 14, 1989 for "Optical Parametric Amplifying Variable Spatial Filter" (hereafter "the Peterson Patent");
2. U.S. Pat. No. 4,884,276 issued to Dixon et al. on Nov. 28, 1989 for "Optical Feedback Control In The Frequency Conversion Of Laser Diode Radiation" (hereafter "the Dixon Patent");
3. U.S. Pat. No. 4,961,195 issued to Skupsky et al. on Oct. 2, 1990 for "Systems For Controlling The Intensity Variations In A Laser Conversion Thereof" (hereafter "the Skupsky Patent");
4. U.S. Pat. No. 5,065,046 issued to Guyer on Nov. 12, 1991 for "Method And Apparatus For Parametric Generation Of Midinfrared Light In $KNbO_3$" (hereafter "the Guyer Patent");
5. U.S. Pat. No. 5,117,126 issued to Geiger on May 26, 1992 for "Stacked Optical Parametric Oscillator" (hereafter "the Geiger Patent");
6. U.S. Pat. No. 5,123,022 issued to Ebbers et al. on Jun. 16, 1992 for "Frequency Mixing Crystal" (hereafter "the Ebbers Patent");
7. U.S. Pat. No. 5,144,630 issued to Lin on Sep. 1, 1992 for. "Multiwavelength Solid State Laser Using Frequency Conversion Techniques" (hereafter "the Lin Patent");
8. U.S. Pat. No. 5,181,212 issued to Moberg on Jan. 19, 1993 for "Method Of Emitting On A Specific Wavelength Fraunhofer Line Using A Neodymium Doped Laser Transmitter" (hereafter "the Moberg Patent");
9. U.S. Pat. No. 5,206,868 issued to Deacon on Apr. 27, 1993 for "Resonant Nonlinear Laser Beam Converter" (hereafter "the Deacon Patent");
10. U.S. Pat. No. 5,274,650 issued to Amano on Dec. 28, 1993 for "Solid State Laser" (hereafter "the Amano Patent");
11. U.S. Pat. No. 5,278,852 issued to Wu et al. on Jan. 11, 1994 for "Intra-Cavity High" (hereafter "the Wu Patent"); and
12. U.S. Pat. No. 5,363,192 issued to Diels et al. on Nov. 8, 1994 for "Intra-Cavity High" (hereafter "the Diels Patent").

The Peterson Patent discloses an optical parametric amplifying variable spatial filter for diffractive imaging in laser systems. It comprises a monolinear crystal which is used to parametrically mix a signal laser and a pump laser to create another beam called an idler. The idler beam has a frequency which has a value which equals the difference between the frequencies of the pump laser and the signal laser, and maintains an image of the object transferred to it. As the crystal optic axis is rotated, the transferred scene changes in that it spectrally scores and amplifies the original object.

The Dixon Patent discloses an optical feedback control in the frequency conversion of a laser diode radiation. The optical radiation from a laser diode is frequency modified through interaction with a nonlinear optical material in an external optical cavity. A high efficiency frequency modification is achieved through the use of optical feedback from the external cavity to narrow the linewidth of the laser diode output and frequency lock the laser diode to the external cavity.

The Skupsky Patent discloses systems for controlling the intensity variations in a laser beam and for frequency conversion thereof. A disperser (grating) provides an output beam which varies spatially in wavelength in at least one direction transverse to the direction of propagation of the beam. Temporal spread (time delay) across the beam is corrected by a phase delay device (a time delay compensation echelon). The dispersed beam may be amplified with laser amplifiers and frequency converted with nonlinear optical elements (birefringent crystals). The spectral variation across the beam is compensated by varying the angle of an incidence on one of the crystals with respect to the crystal optical axis utilizing a lens which diverges the beam. The frequency-converted beam is recombined so that portions of different frequency interfere and, unlike interference between waves of the same wavelength, there results an intensity pattern with rapid temporal oscillations which average out rapidly in time thereby producing uniform illumination on target. A distributed phase plate or random phase mask, through which the spectrally dispersed beam is passed and then focused on a target, is used to provide the interference pattern which becomes nearly modulation free and uniform in intensity in the direction of the spectral variation.

The Guyer Patent discloses a method and apparatus for parametric generation of midinfrared light in $KNbO_3$. A pump beam and a signal beam impinge on a $KNbO_3$ crystal and interact to produce optical energy at an idler wavelength and a signal wavelength at the expense of optical energy of the impinging pump beam wavelength.

The Geiger Patent discloses a stacked optical parametric oscillator. It comprises two or more optically nonlinear media (crystals) which are coaxially disposed in a single resonator. Incident is coupled into the resonator, and causes parametric oscillations of the two crystals.

The Lin Patent discloses a multiwavelength solid state laser using frequency conversion techniques. It disclosed the usage of the nonlinear crystals.

The Moberg Patent discloses a method of emitting on a specific wavelength Fraunhofer line using a neodymium doped laser transmitter.

The Deacon Patent discloses a resonant nonlinear laser beam converter. It comprises two nonlinear converters which are disposed in a single buildup cavity.

The Amano Patent discloses a solid state laser. It comprises a pair of mirrors constituting a laser resonator, a plurality of nonlinear optical crystals placed between the pair of mirrors, and a pump source for irradiating pump light on the crystals. The crystals are operative to generate both of the fundamental-wave laser light and harmonic laser light in response to the pump light.

The Wu Patent discloses an intra-cavity high order harmonic laser. It disclosed a polarization rotator and a beam recombiner between two nonlinear crystals.

The Ebbers Patent discloses frequency mixing crystals.

The Diels Patent discloses a mode-locked active gyro solid state lasers. It disclosed a frequency tripler.

The present invention is particularly related to the compensation of time delays in pulsed laser devices, especially in picosecond and femtosecond pulsed laser devices. Two laser pulses, having respective center frequencies ($\omega_1$) and ($\omega_2$) traveling through any dispersive material, have different speeds, i.e., Group Velocity Dispersions (GVDs). Because of the difference in their GVDs, two overlapped laser pulses may be completely separated in time after passing through optics such as crystals, lenses, and mirrors. This separation in time is referred to as a time delay, or temporal spread, of the two laser pulses.

In many pulsed laser devices, the time delay caused by GVD is very crucial and must be compensated. For example, in femtosecond third harmonic generation, because of the time delay between the fundamental ($\omega$) and the second harmonic ($2\omega$) pulses, the third harmonic ($3\omega$) pulse can be very weak or not be generated at all.

Conventionally a delay line device has been utilized to compensate the time delay in pulsed laser devices. A typical delay line device utilizes two beam splitters (or dichroic mirrors), several mirrors, and a translation stage. It functions through the following three steps: (1) the separation of two input laser pulses by the first beam splitter; (2) each of the two pulses traveling through different path directed by the mirrors and the time delay between the two laser pulses being adjusted by using the translation stage to change the path length of one of the pulses; (3) the recombination of the two pulses by the second beam splitter.

However, the general drawbacks of delay line devices are that many components have to be used, that the recombination step may be very difficult, as the time delay and space overlap of pulses are very sensitive to the space displacement of the pulses. Delay line devices are also generally very complicated, expensive, and large in physical dimensions.

Therefore, it is desirable to have a new device for compensating the time delays in pulsed laser devices, which can overcome the drawbacks of conventional delay line devices, as well as provide new features for the time delay compensation.

SUMMARY OF THE INVENTION

The present invention is a tunable time plate for the compensation of time delays in pulsed laser devices, particularly the picosecond and femtosecond pulsed laser devices.

It is an object of the present invention to provide a new "time plate" device for compensating the time delay between two laser pulses. The new time plate device utilizes one or more specially manufactured crystals. Each crystal is called a "time plate" and is generally rectangular shaped with two parallel surfaces. The time plate is positioned in the passage of two picosecond and/or femtosecond laser pulses. The optical property of the crystal causes a time dispersion between the two laser pulses. The time plate can be rotated about one of its axis to adjust the incident angle of the laser pulses, which in turn adjusts the amount of the time dispersion. This time dispersion can be used to compensate the time delay in many laser apparatuses, such as a third harmonic generator ("tripler"), or an autocorrelator.

In one of the basic embodiments of the present invention, the tunable time plate device includes a flat birefringence crystal (referred to as a "time plate" or "TP") at predetermined cutting angles mounting on a rotational stage. When two laser pulses travel through the TP crystal, a time delay between them is generated without the separation and recombination steps in a conventional delay line device. The adjustment of the time delay is achieved by rotating the TP crystal. The time delay is determined by the rotation angle, the cutting angle, the thickness, and the indices of refraction of the TP crystal. In other alternative embodiments of the present invention, the tunable time plate device is utilized in femtosecond third harmonic generators (THG) and autocorrelator.

The present invention tunable time plate device has many unique and advantageous features. It is easily tunable, highly efficient and compact in design. It is more reliable, easier to use, and less expensive than conventional delay line device. The laser pulses devices that utilizing the present invention time plate device, such as the femtosecond third harmonic generator (THG) and autocorrelator disclosed herein below, have high efficiency and are more compact, easier to use, and less expensive than those utilizing the conventional delay line device.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
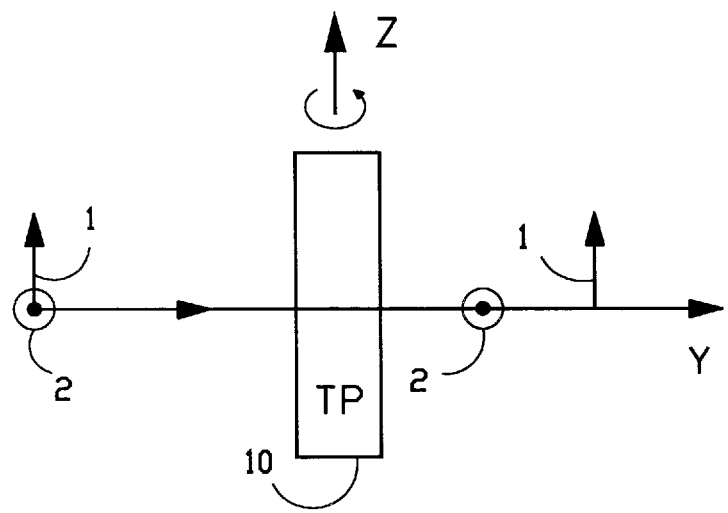
FIG. 1 is an illustrative diagram showing the basic arrangement of the present invention tunable time plate device for compensation of time delays in pulsed laser devices, particularly the picosecond and femtosecond pulsed laser devices.

Referring to FIG. 1, showing one of the preferred embodiments of the present invention, there is shown a basic arrangement of the present invention tunable time plate device for compensation of time delays in pulsed laser devices, particularly the picosecond and femtosecond pulsed laser devices. The present invention tunable time plate device utilizes a time plate (TP) 10 which is made of a birefringence crystal with a predetermined cutting angle. The TP 10 is mounted on a rotatable stage (not shown) for rotation around its $n_z$ principal axis of the refractive indices. The rotation of the TP 10 provides a mechanism of continually adjusting the time delay between two linearly polarized laser pulses 1 and 2 traveling through it. The types of crystal which may be used to make TP 10 include calcite, quartz, alpha-barium borate ($\alpha$-BBO), and yttrium orthovanadate ($YVO_4$). The detailed geometry of the TP crystal 10 and the two laser pulses $\omega_1$ 1 and $\omega_2$ 2 is described in FIG. 2 (note that while FIG. 1 is drawn in the Y-Z plane, FIG. 2 is drown in the X-Y plane, of the Cartesian coordinate system X-Y-Z).

Figure 2:
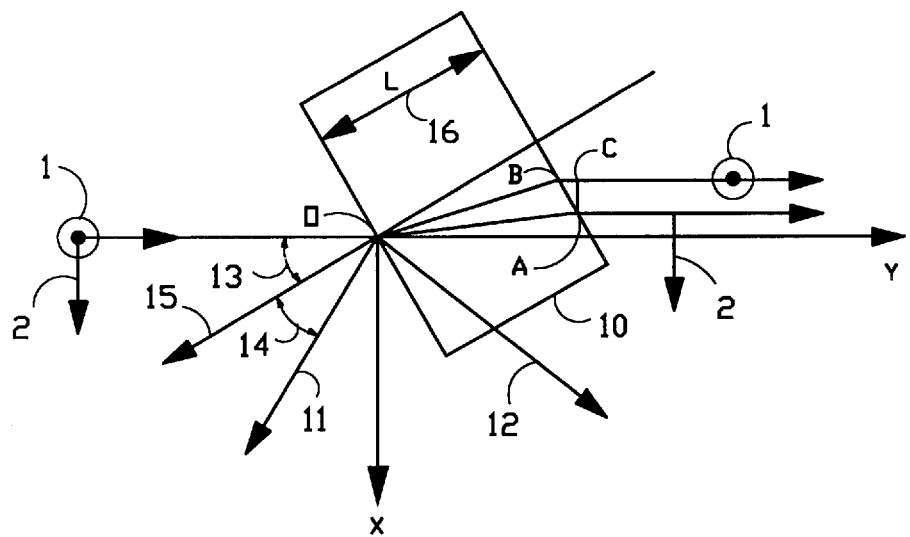
FIG. 2 is an illustrative diagram of the detail configurations of the present invention tunable time plate device of single crystal and two linearly polarized laser pulses.

Referring to FIG. 2, the TP crystal 10 has the $n_z$ principal index axis parallel to the crystal surface and parallel to the Z-axis of the Cartesian-coordinate system X-Y-Z. Other two principal index axes $n_x$ 11 and $n_y$ 12 are in the X-Y plane of the Cartesian-coordinate system. If TP crystal is an uniaxial crystal, then $n_x=n_e$, and $n_y=n_z=n_o$, where $n_e$ and $n_o$ are the indices of refraction for the extraordinary and ordinary waves. The angle between the $n_x$ axis 11 of the TP crystal 10 and the surface normal 15 is $\phi$14.

The rotation angle of the time plate around the Z-axis is described by the incident angle $\theta$13 of the propagation direction of the laser pulses to the surface normal 15. The rotation angle $\theta$ is positive if $\theta$ and $\phi$ are on the different side of the surface normal 15 or is negative if $\theta$ and $\phi$ are on the same side of the surface normal 15.

The two pulses $\omega_1$ 1 and $\omega_2$ 2 propagate in the Y-direction. The pulse $\omega_1$ 1 is polarized in the Z-direction and the pulse $\omega_2$ 2 in the X-direction. Therefore, the pulse $\omega_1$ 1 has the fixed index n, but the pulse $\omega_2$ 2 has a variable index $n_2$ depending on the angles $\theta$ and $\phi$. As a result, the time for the pulses $\omega_1$ 1 and $\omega_2$ 2 to travel through the TP 10 is different and the time delay (difference) between the pulses $\omega_1$ 1 and $\omega_2$ 2 is a function of the angles $\theta$ and $\phi$.

As illustrated in FIG. 2, the time delay $\Delta t$ between the pulses $\omega_1$ 1 and $\omega_2$ 2 is defined as the difference of the time ($t_2$) for pulse $\omega_2$ 2 to travel through the distance $d_{OA}$ inside the TP crystal 10, and the time ($t_1$) for pulse $\omega_1$ 1 to travel through the distance $d_{OB}$ inside the TP crystal 10 and the distance $d_{BC}$ in the air. Using the geometry in FIG. 2, the law of refraction, and the equation of angle dependent refractive index of birefringence crystals, the time delay $\Delta t$ between the pulses $\omega_1$ 1 and $\omega_2$ 2 can be calculated as follows:

$$\Delta t = t_2 - t_1 = (L/c) \cdot ((n_2^2 - \sin^2\theta)^{1/2} - (n_{z1}^2 - \sin^2\theta)^{1/2}) \quad [1]$$

where:

$$n_2 = (1/A) \cdot \{A \cdot C + B^2/2 + (B/2) \cdot (B^2 - 4A^2\sin^2\theta + 4A\cdot C)^{1/2}\}^{1/2} \quad [2]$$

$$A = \sin^2\phi/n_{x2}^2 + \cos^2\phi\, n_{y2}^2 \quad [3]$$

$$B = (1/n_{x2}^2 - 1/n_{y2}^2) \cdot \sin(2\phi) \cdot \sin\theta \quad [4]$$

$$C = 1 - (1/n_{x2}^2 - 1/n_{y2}^2) \cdot \cos(2\phi) \cdot \sin^2\theta \quad [5]$$

wherein:

L 16 is the thickness of the crystal;

c is the velocity of light;

$n_{z1}$ is the index of refraction in the principal Z-axis for the pulse $\omega_1$ 1;

$n_{x2}$ is the index of refraction in the principal X-axis for the pulse $\omega_2$ 2;

$n_{y2}$ is the index of refraction in the principal Y-axis for the pulse $\omega_2$ 2;

$n_2$ is the actual index of refraction for the pulse $\omega_2$ 2;

$\phi$14 is the angle of the $n_x$ principal axis 11 to the surface normal 15; and $\theta$13 is the tuning (incident) angle.

Figure 3:
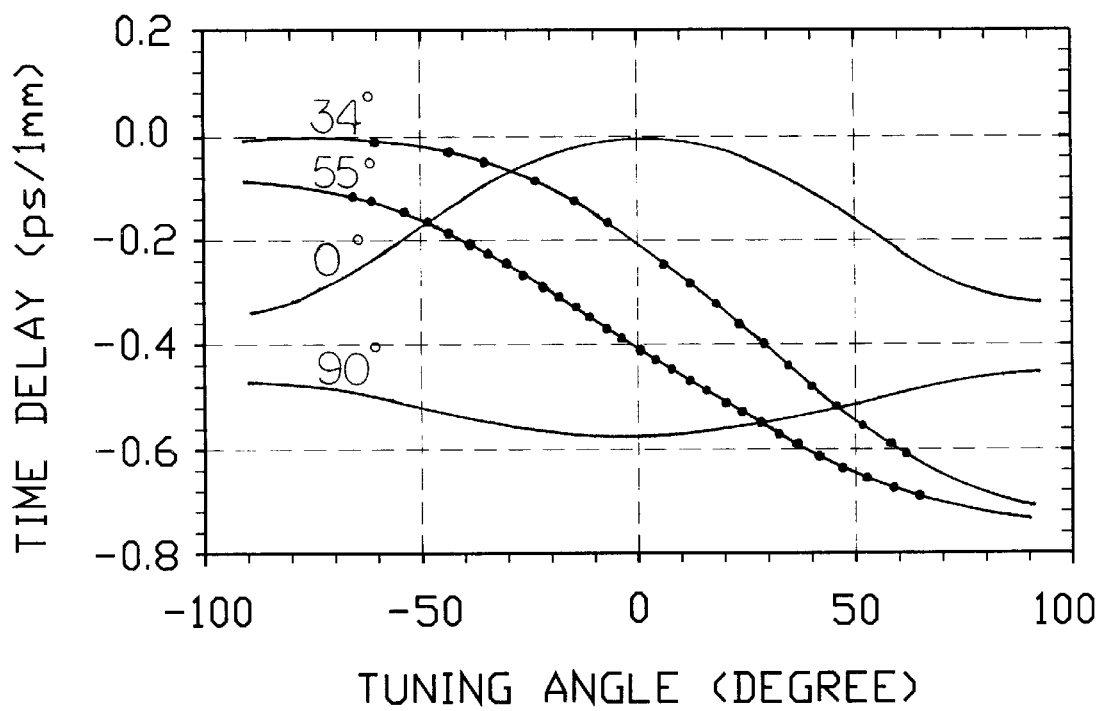
FIG. 3 is a plotted diagram illustrating the calculated tuning curves of the time delay, as compared to the measured tuning curves of the time delay, for the present invention tunable time plate device of single calcite crystal at various cutting angles.

The Equations [1] through [5] are the fundamental equations for designing the TP crystal 10. Their accuracy is verified by the experimental result. FIG. 3 is a plotted diagram illustrating the calculated tuning curves of the time delay, as compared to the experimental data of the time delay.

The smooth curves of FIG. 3 are the calculated time delay $\Delta t$ via the incident angle $\theta$ for a calcite crystal TP cut at cutting angle $\phi=0°$, 34°, 55° and 90°, to demonstrate the dependence of the time delay $\Delta t$ on the tuning angle $\theta$ and the cutting angle $\phi$. In the calculations, $\omega_1$ and $\omega_2$ are the same and the corresponding center wavelength is 632.8 nm. The indices used here at 632.8 nm are $n_{x2}=n_e=1.48018$ and $n_{y2}=n_{z1}=n_o=1.65577$, respectively. The vertical axis in FIG. 3 is the time delay $\Delta t$ and the horizontal axis is the tuning angle $\theta$. The number shown at the top of each curve is the cutting angle $\phi$. As can be seen, the TP crystals with cutting angles $\phi=34°$ and 55° have larger tuning range (approximately 600 femtoseconds per millimeter crystal) than those crystals with cutting angles $\phi=0°$ and 90° (approximately 300 femtoseconds per millimeter crystal). Therefore, the TP crystals with cutting angles $\phi=34°$ and 55° seem to be the better choices. Moreover, the TP crystal with cutting angle $\phi=55°$ seems to be more preferable because it has almost a linear dependence on the tuning angle $\theta$ centered at zero degree and ranging from −300 to +300 femtoseconds (fs).

The dotted points in FIG. 3 are the time delays $\Delta t$ measured by the experiments with TP crystals with cutting angles $\phi=34°$ and 55°, respectively. It can be seen that the measurement data and the calculations are matched very well.

To have larger time delay, a thicker crystal TP may be used since the time delay $\Delta t$ is proportional to the thickness of the crystal (L). Also a crystal TP having larger difference of the refractive indices ($n_x-n_y$) gives a larger time delay $\Delta t$.

Further preferred embodiments of the present invention tunable time plate device will be described as follows, based on the basic principles of the present invention as illustrated in FIGS. 1 through 3. These embodiments will be described as they are depicted in FIGS. 4 through 11. However, in the following description, the same features or functions will not be described repeatedly. Rather, the focus will be on the differences of these further embodiments from the basic arrangement.

Figure 4:
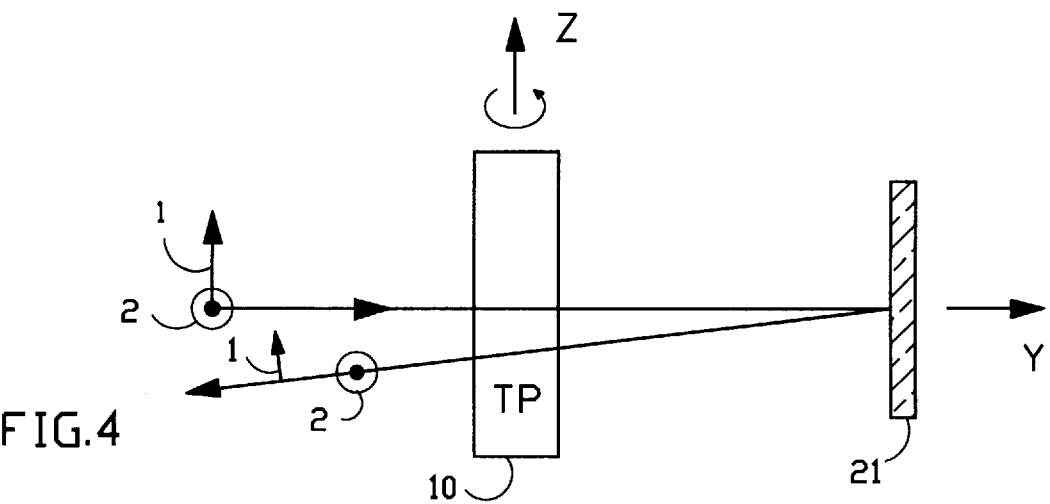
FIG. 4 is an illustrative diagram of a present invention tunable time plate device of the design of single crystal and single mirror.

Referring to FIG. 4, there is shown an illustrative diagram of a present invention tunable time plate device of the design of single crystal and single mirror. This design has one mirror 21 added to the TP crystal 10 in the basic design. In this embodiment, the laser pulses 1 and 2 after traveling through the TP crystal 10 are reflected back by the mirror 21 and pass through the TP crystal 10 again at the same incident angle θ but tilted down a small angle to allow the out-going pulses to be separated from the in-coming path. This design almost eliminates the space displacement of the pulses 1 and 2 existed in the basic design (off the Y-axis as illustrated in FIG. 2), and doubles the time delay.

Figure 5:
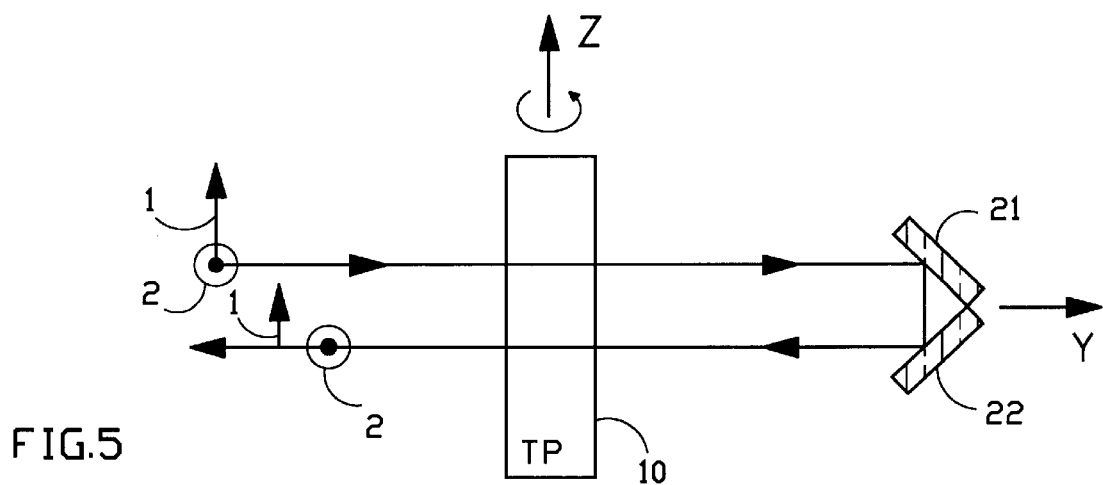
FIG. 5 is an illustrative diagram of a present invention tunable time plate device of the design of single crystal and double mirrors.

Referring to FIG. 5, there is shown an illustrative diagram of a present invention tunable time plate device of the design of single crystal and double mirrors. This design has two mirrors 21 and 22 added to the basic design. In this design, the laser pulses 1 and 2 after passing through the TP crystal 10 are reflected down a distance by the first mirror 21 and then reflected back through the crystal by the second mirror 22. This design has a double time delay and can completely eliminate the space displacement of the two pulses.

In addition, in many applications, a continually adjustable time delay Δt from negative to positive is desired. As illustrated in FIG. 3, the basic single TP crystal design is not centered at the time zero. To obtain a time delay centered at time zero, the present invention provides further designs utilizing two TP crystals, as described below.

Figure 6:
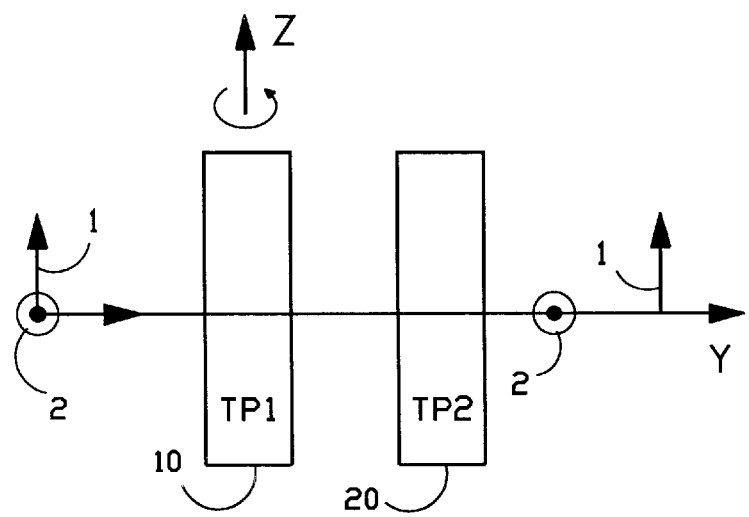
FIG. 6 is an illustrative diagram of a present invention tunable time plate device of the design of double crystals.

Referring to FIG. 6, there is shown an illustrative diagram of a present invention tunable time plate device of the design of double crystals. This double-crystal design has another TP crystal 20 added to the first TP crystal 10. The second TP crystal 20 is placed after the first TP crystal 10 and is used to shift the time zero. It is preferable to cut the two TP crystals 10 and 20 with the same cutting angle φ, e.g. φ=55°. The first TP crystal 10 has the $n_z$ axis in the Z-direction and is placed on a rotatable stage (not shown) so that it can be rotated around the Z-axis for tuning the time delay. The second TP crystal 20 has the $n_z$ axis in the X-direction of the fixed frame and has a fixed zero incident angle (θ=0°).

The laser pulses 1 and 2 travel through both of the TP crystals 10 and 20. As the first TP crystal 10 is at the tuning angle θ=0°, the total time delay is zero since the time delay of the second TP crystal 20 exactly cancels the time delay of the first TP crystal 10. When the tuning angle θ is rotated from negative to positive, the time delay also changes from positive to negative (if $n_x > n_y$) or from negative to positive ($n_y > n_x$). The total time delay is equal to the time delay of the first TP crystal 10 at the actual incident angle subtracts the time delay of the second TP crystal 20 at θ=0°.

Figure 7:
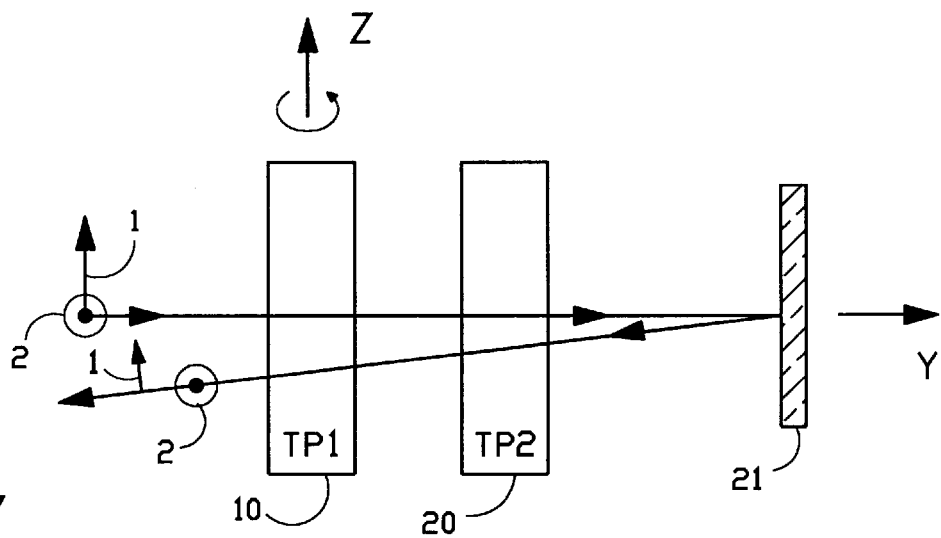
FIG. 7 is an illustrative diagram of a present invention tunable time plate device of the design of double crystals and single mirror.

Referring to FIG. 7, there is shown an illustrative diagram of a present invention tunable time plate device of the design of double crystals and single mirror. This design has one mirror 21 added to the two TP crystals 10 and 20. The laser pulses 1 and 2 after traveling through the TP crystals 10 and 20 are reflected back by the mirror 21 and go through the TP crystals 10 and 20 again at the same incident angle but tilted down a small angle to be separated from the in-coming path. This design can almost eliminate the space displacement of the pulses and has a double time delay which is centered at time zero.

Figure 8:
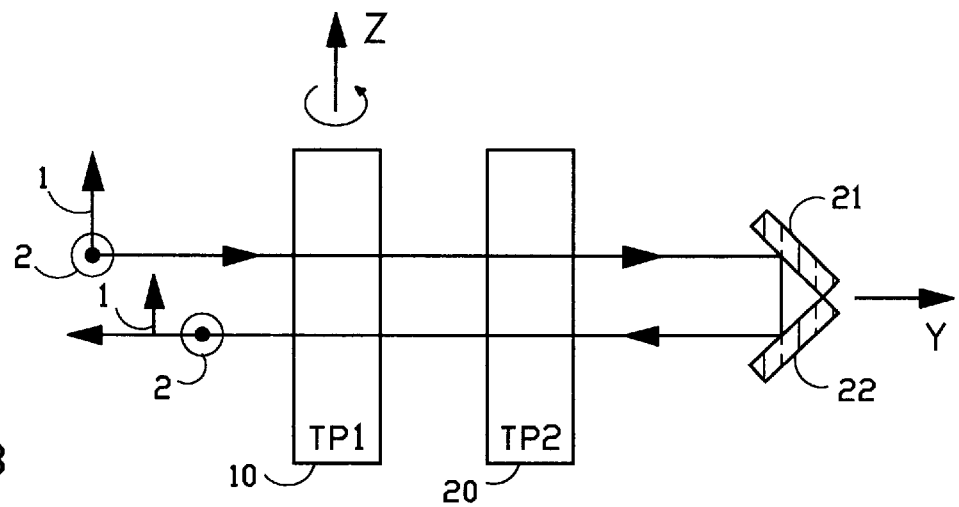
FIG. 8 is an illustrative diagram of a present invention tunable time plate device of the design of double crystals and double mirrors.

Referring to FIG. 8, there is shown an illustrative diagram of a present invention tunable time plate device of the design of double crystals and double mirrors. This design has two mirrors 21 and 22 added to the two TP crystals 10 and 20. In this design, the pulses 1 and 2 after traveling through the TP crystals 10 and 20 are reflected down by the first mirror 21 and then reflected back through the crystals again by the second mirror 22. This design can completely eliminate the space displacement and has a double time delay which is centered at time zero.

The various embodiments of the present invention time plate device can be utilized in many laser pulse devices such as third harmonic generators (THGs) and autocorrelators, to replace the conventional delay line devices. The present invention designs of the time plate device make the laser pulse devices more efficient, compact, easier to use, and less expensive. The following descriptions are merely examples of the many laser pulse devices which can utilize the present invention tunable time plate device.

Figure 9:
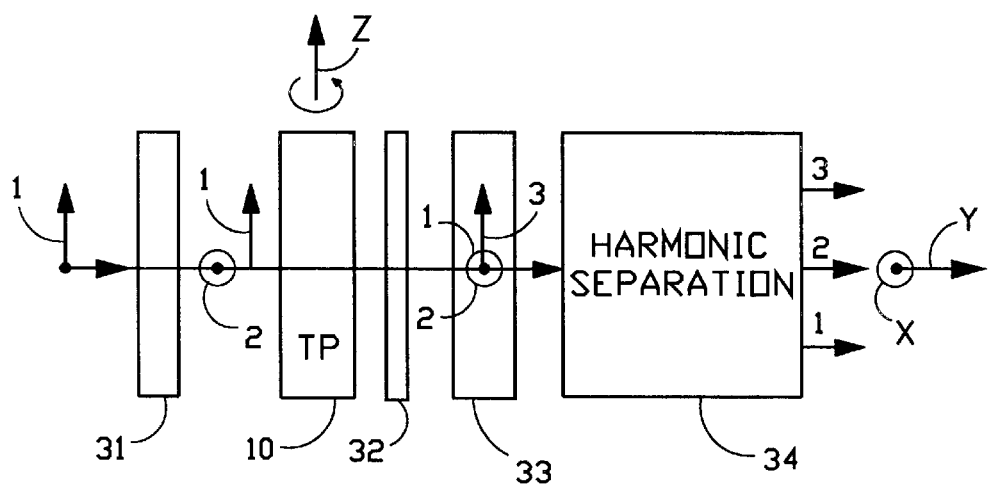
FIG. 9 is an illustrative diagram of a femtosecond third harmonic generator utilizing the present invention tunable time plate device.

Referring to FIG. 9, there is shown an illustrative diagram of a femtosecond third harmonic generator (THG) utilizing the present invention tunable time plate device. The THG consists of a second harmonic generation (SHG) crystal 31, a TP crystal 10 prepared pursuant to this invention, a half wave plate 32, a third harmonic generation (THG) crystal 33, and a unit of harmonic separation 34. The SHG and THG crystals 31 and 33 are mounted in rotation stages for tuning the wavelength. The types of crystals that may be used for SHG and THG include beta-barium borate (β-BBO), lithium triborate (LBO), potassium titanyl phosphate (KDP), cesium triburate (CBO), and cesium lithium borate (CLBO).

The input fundamental pulse (ω) 1 polarized along the Z-axis pumps the SHG crystal 31 to generate the SHG pulse (2ω) 2 which is polarized along X-axis. The SHG pulse (2ω) 2 and the remain fundamental pulse (ω) 1 pass through the TP crystal 10 for the time compensation. The TP crystal 10 has its $n_x$ principal axis in the X-Y plane and can be rotated around the Z-axis so that the fundamental is the pulse $\omega_1$ and the SHG pulse is the pulse $\omega_2$ 2 as configured in FIG. 2. The positive time delay between the fundamental and the SHG pulses 1 and 2, due to the group velocity dispersion (GVD) of the SHG and THG crystals 31 and 33 and the half-waveplate 32, is compensated by the negative time delay of the TP crystal 10. The time compensation is adjustable by tuning the angle θ of the TP crystal 10. The half-waveplate 32 rotates the Z-polarized fundamental pulse 1 to the X-polarization yet keeping the SHG pulse 2 X-polarized.

The time compensated fundamental pulse 1 and SHG pulse 2 then generate the THG pulse (3ω) 3 in the THG crystal 33 via the frequency summation process. Finally, the THG, SHG, and fundament pulses 3, 2 and 1 are separated by the harmonic separation unit 34.

In one of embodiments of the THG devices utilizing the present invention tunable time plate device, the TP crystal used is a 2 mm thick calcite crystal at the cutting angle φ=55°. This single TP crystal worked well for the SHG and THG crystals ranging from 0.1 to 1.5 mm thick. With a 0.3 mm thick BBO SHG crystal and a 0.3 mm BBO THG crystal, this particular embodiment has generated the THG pulses at 266 nm having pulse energy of 60 μJ and pulse width of 160 fs from the input pulses at 800 nm having pulse energy of 700 μJ and pulse width 70 fs. Without the present invention tunable time plate device, only a very weak pulse at 266 nm can be generated (<1 μJ pulse energy).

Figure 10:
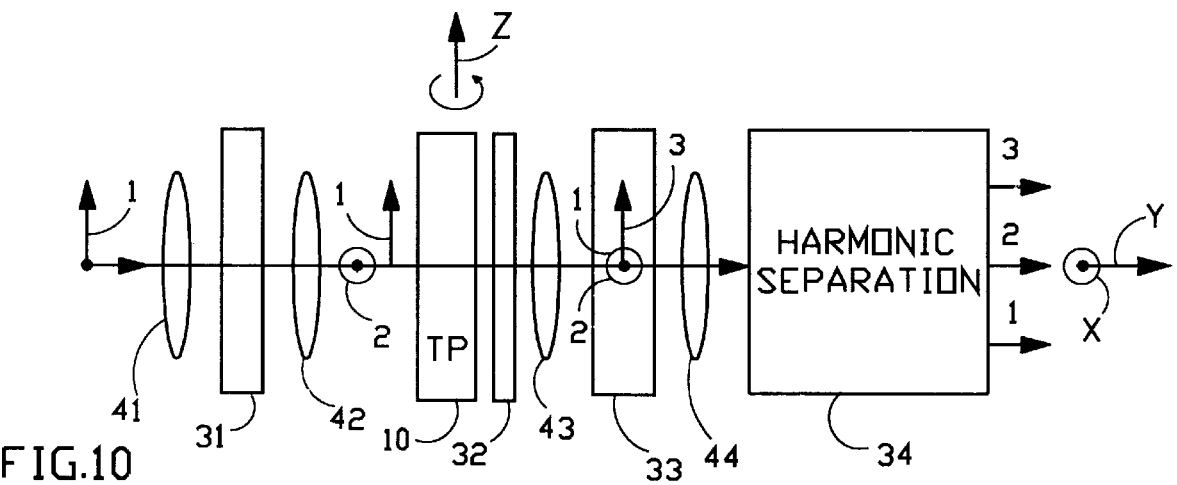
FIG. 10 is an illustrative diagram of an alternative femtosecond third harmonic generator utilizing the present invention tunable time plate device.

Referring to FIG. 10, there is shown an illustrative diagram of an alternative femtosecond third harmonic generator for low pulse energy, utilizing the present invention tunable time plate device. The differences of this alternative design from the above THG design of FIG. 9 are that four additional lenses 41, 42, 43, and 44 are used to compensate the low input pulse energy. The input fundamental pulse (ω) 1 polarized along Z-axis is first focused by the first lens 41 before the SHG crystal 31, then generates the SHG pulse (2ω) 2 in the SHG crystal 31. The fundamental and SHG pulses 1 and 2 are collimated by the second lens 22 located after the SHG crystal 31 and pass through the TP crystal 10 and the half-waveplate 32 for compensating the time delay and adjusting the polarization of pulses. The third lens 43 located before the THG crystal 33 is used to focus the fundamental and the SHG pulses 1 and 2 into the THG crystal 33 to efficiently generate the THG pulse (3ω) 3. The fourth lens 24 located after the THG crystal 33 is used to collimate the three harmonic. Finally, the THG, SHG, and fundament pulses 3, 2, and 1 are separated by the harmonic separation unit 34.

Figure 11:
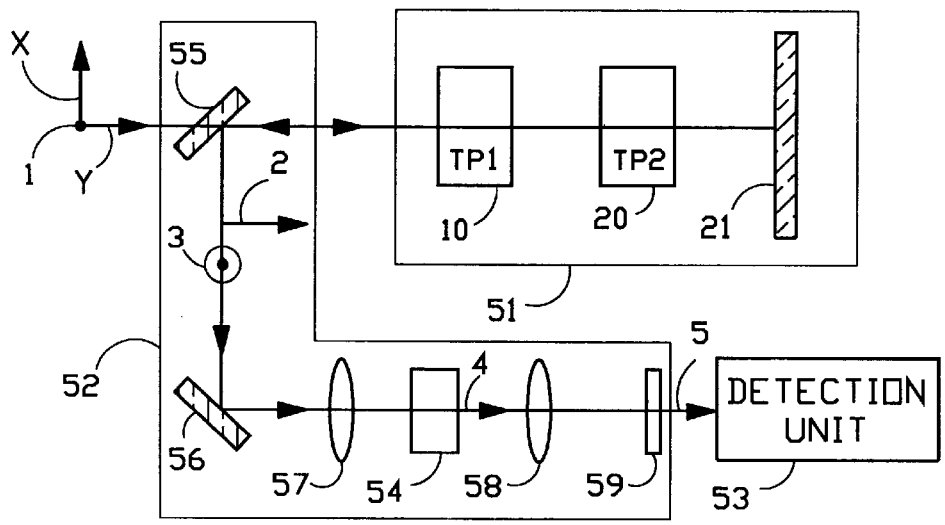
FIG. 11 is an illustrative diagram of an autocorrelator utilizing the present invention tunable time plate device.

Referring to FIG. 11, there is shown an illustrative diagram of an autocorrelator utilizing the present invention tunable time plate device. This design of autocorrelator includes three units: a time delay unit 51, an autocorrelation unit 52, and a signal detection unit 53. The time delay unit 51 is the same time plate device of the double-crystal and single-mirror design as shown in FIG. 7 (note that FIG. 7 is drawn in the Y-Z plane but FIG. 11 is drawn in the X-Y plane of the Cartesian coordinate system).

The autocorrelation unit 52 includes a second harmonic crystal 54, two mirrors 55 and 56, two lenses 57 and 58, and a filter 59. The types of SHG crystal 54 used here includes beta-barium borate (β-BBO), lithium triborate (LBO), potassium titanyl phosphate (KDP), cesium triburate (CBO), and cesium lithium borate (CLBO).

The laser pulse (ω) 1 to be measured is polarized 45° to the X-axis so that the pulse is decomposed into two polarization components with equal intensity: the X-component 2 and the Z-component 3. A time delay between the two polarization components 2 and 3 is generated after the pulse traveling through the time delay unit 51. The time delay is controlled by the tuning angle of the TP crystal 10. Then the two polarization components 2 and 3 going out of the time delay unit 51 are directed by the mirrors 55 and 56. The lens 57 after the mirror 56 focus these two components 2 and 3 into the SHG crystal 54 for autocorrelation. The SHG crystal 54 is mounted for rotation to tuning the phase match angle. The SHG signal (2ω) 4 is generated when the two polarization components overlap each other in time which is controlled by the time delay of the time delay unit 51. Then the SHG signal (2ω) 4 is collimated by the lens 58. The filter 59 is used to cut off the input pulse (ω) from the SHG signal (2ω).

Finally, the filtered signal (2ω) 5 is detected by the detection unit 53. The detection unit may include a detector such as a photo-multiplier or a photo diode. The autocorrelation signal from the detector which depends on the time delay can be displayed by an oscilloscope or recorded by a computer. Because the time plate device of this invention was utilized instead of the conventional delay line device, the autocorrelator is more compact, easy to use, and reliable. In addition, this autocorrelator can be used to measure cross-correlation of two pulses having different frequency.

Defined broadly, the present invention is an apparatus for providing a continually adjustable time delay between two laser pulses $\omega_1$ and $\omega_2$ which are linearly polarized respectively along the Z-axis and the X-axis, and propagate in a direction along the Y-axis, of a Cartesian coordinate system, the apparatus comprising: (a) a time plate made of a parallel flat birefringence crystal having a principal axis of refractive index $n_z$ parallel to its surface, and a principal axis of refractive index $n_x$ having an angle $\phi$ to its surface normal; and (b) the time plate rotatably mounted such that its $n_z$ principal axis coincides with the Z-axis, and it is rotatable about its $n_z$ principal axis for adjusting a time delay between the two laser pulses $\omega_1$ and $\omega_2$ as they travel through the time plate, which time delay is a function of an incident angle θ between the surface normal of the crystal and the propagation direction of the two laser pulses $\omega_1$ and $\omega_2$; (c) whereby the time delay can be continually adjusted by rotating the time plate to change the incident angle θ.

Defined alternatively, the present invention is a femtosecond third harmonic generator for generating a third harmonic generation pulse (3ω) from a fundamental pulse (ω) which is linearly polarized along the Z-axis and propagates in a direction along the Y-axis of a Cartesian coordinate system, the femtosecond third harmonic generator comprising: (a) a second harmonic generation (SHG) crystal for generating a SHG pulse (2ω) which is linearly polarized along the X-axis of the Cartesian coordinate system; (b) a half-waveplate positioned behind the SHG crystal for rotating the fundamental pulse (ω) to polarize along the X-axis; (c) a third harmonic generation (THG) crystal positioned behind the half-waveplate for generating the THG pulse (3ω) from the fundamental pulse (ω) and the SHG pulse (2ω); and (d) a time plate made of a parallel flat birefringence crystal having a principal axis of refractive index $n_z$ parallel to its surface, and a principal axis of refractive index $n_x$ having an angle $\phi$ to its surface normal, and rotatably mounted between the SHG crystal and the half-waveplate, such that its $n_z$ principal axis coincides with the Z-axis, and it is rotatable about its $n_z$ principal axis, for adjustably compensating a time delay between the fundamental pulse (ω) and the SHG (2ω) after they travel through the SHG crystal, where the amount of time delay compensation is a function of an incident angle θ between the surface normal of the time plate crystal and the propagation direction of the fundamental pulse (ω) and the SHG pulse (2ω); (e) whereby the time delay compensation can be continually adjusted by rotating the time plate crystal to change the incident angle θ.

Defined also alternatively, the present invention is an autocorrelator for measuring a laser pulse having two polarization components $\omega_z$ and $\omega_x$ which are linearly polarized respectively along the Z-axis and the X-axis of a Cartesian coordinate system, the autocorrelator comprising: (a) a time delay unit further comprising at least one time plate made of a parallel flat birefringence crystal having a principal axis of refractive index $n_z$ parallel to its surface, and a principal axis of refractive index $n_x$ having an angle $\phi$ to its surface normal, and rotatably mounted such that its $n_z$ principal axis coincides with the Z-axis, and it is rotatable about its $n_z$ principal axis, for adjusting a time delay between the two polarization components $\omega_z$ and $\omega_x$ after they travel through the at least one time plate crystal, where the time delay is a function of an incident angle θ between the surface normal of the time plate crystal and the direction propagation of the two polarization components $\omega_z$ and $\omega_x$; an (b) an autocorrelation unit further comprising at least one second harmonic generation (SHG) crystal for autocorrelation; (c) whereby a SHG signal (2ω) can be generated for detection when the two polarization components $\omega_z$ and $\omega_x$ overlap each other in time which is controlled by the time delay, which is in turn generated and adjusted by the time delay unit.

Of course the present invention is not intended to be restricted to any particular form or arrangement, or any specific embodiment disclosed herein, or any specific use, since the same may be modified in various particulars or relations without departing from the spirit or scope of the claimed invention herein above shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An apparatus for providing a continually adjustable time delay between two laser pulses $\omega_1$ and $\omega_2$ which are linearly polarized respectively along the Z-axis and the X-axis, and propagate in a direction along the Y-axis, of a Cartesian coordinate system, the apparatus comprising:
   a. a time plate made of a parallel flat birefringence crystal having a principal axis of refractive index $n_z$ parallel to its surface, a principal axis of refractive index $n_y$, and a principal axis of refractive index $n_x$ having an angle $\theta$ to its surface normal, where $n_x$ is different from $n_y$ and $n_z$;
   b. said time plate rotatably mounted such that its $n_z$ principal axis coincides with said Z-axis, and it is rotatable about its $n_z$ principal axis for adjusting a time delay between said two laser pulses $\omega_1$ and $\omega_2$ as they travel through said time plate, which time delay is a function of an incident angle $\theta$ between said surface normal of said crystal and said propagation direction of said two laser pulses $\omega_1$ and $\omega_2$;
   c. whereby said time delay can be continually adjusted by rotating said time plate to change said incident angle $\theta$.

2. The apparatus as defined in claim 1, wherein said crystal is selected from the group consisting of calcite crystal, quartz crystal, alpha-barium borate ($\alpha$-BBO) crystal, and yttrium orthovanadate ($YVO_4$) crystal.

3. The apparatus as defined in claim 1, wherein said crystal is a birefringence crystal.

4. The apparatus as defined in claim 1 further comprising a mirror located behind said time plate for reflecting said two laser pulses $\omega$ and $\omega_2$ back to said time plate such that they travel through said time plate again with the same incident angle $\theta$ to reduce spatial displacement of said two laser pulses $\omega_1$ and $\omega_2$.

5. The apparatus as defined in claim 1 further comprising two mirrors positioned in right angle to each other and behind said time plate for reflecting said two laser pulses $\omega_1$ and $\omega_2$ back to said time plate along a direction parallel and opposite to their initial propagation direction such that they travel through said time plate again with the same incident angle $\theta$ to eliminate spatial displacement of said two laser pulses $\omega_1$ and $\omega_2$.

6. The apparatus as defined in claim 1 further comprising an additional time plate made of an identical crystal having the same cutting angle $\phi$, but positioned such that its principal axis of refractive index $n_z$ is parallel to said X-axis of said Cartesian coordinate system, and having a fixed zero incident angle, to provide a total time delay which is centered at time zero and can be continually adjusted from negative time delay to positive time delay.

7. The apparatus as defined in claim 6, wherein said crystal is selected from the group consisting of calcite crystal, quartz crystal, alpha-barium borate ($\alpha$-BBO) crystal, and yttrium orthovanadate ($YVO_4$) crystal.

8. The apparatus as defined in claim 6, wherein said crystal is a birefringence crystal.

9. The apparatus as defined in claim 6 further comprising a mirror located behind said additional time plate for reflecting said two laser pulses $\omega$ and $\omega_2$ back to said time plates such that they travel through said time plates again with the same incident angle $\theta$ to reduce spatial displacement of said two laser pulses $\omega_1$ and $\omega_2$.

10. The apparatus as defined in claim 6 further comprising two mirrors positioned in right angle to each other and behind said additional time plate for reflecting said two laser pulses $\omega_1$ and $\omega_2$ back to said time plates along a direction parallel and opposite to their initial propagation direction such that they travel through said time plates again with the same incident angle $\theta$ to eliminate spatial displacement of said two laser pulses $\omega_1$ and $\omega_2$.

11. A femtosecond third harmonic generator for generating a third harmonic generation pulse ($3\omega$) from a fundamental pulse ($\omega$) which is linearly polarized along the Z-axis and propagates in a direction along the Y-axis of a Cartesian coordinate system, the femtosecond third harmonic generator comprising:
   a. a second harmonic generation (SHG) crystal for generating a SHG pulse ($2\omega$) which is linearly polarized along the X-axis of said Cartesian coordinate system;
   b. a half-waveplate positioned behind said SHG crystal for rotating said fundamental pulse ($\omega$) to polarize along said X-axis;
   c. a third harmonic generation (THG) crystal positioned behind said half-waveplate for generating said THG pulse ($3\omega$) from said fundamental pulse ($\omega$) and said SHG pulse ($2\omega$); and
   d. a time plate made of a parallel flat birefringence crystal having a principal axis of refractive index n, parallel to its surface, and a principal axis of refractive index $n_x$ having an angle $\phi$ to its surface normal, and rotatably mounted between said SHG crystal and said half-waveplate, such that its $n_z$ principal axis coincides with said Z-axis, and it is rotatable about its $n_z$ principal axis, for adjustably compensating a time delay between said fundamental pulse ($\omega$) and said SHG ($2\omega$) after they travel through said SHG crystal, where the amount of time delay compensation is a function of an incident angle $\theta$ between said surface normal of said time plate crystal and said propagation direction of said fundamental pulse ($\omega$) and said SHG pulse ($2\omega$);
   e. whereby said time delay compensation can be continually adjusted by rotating said time plate crystal to change said incident angle $\theta$.

12. The apparatus as defined in claim 11, wherein said time plate crystal is selected from the group consisting of calcite crystal, quartz crystal, alpha-barium borate ($\alpha$-BBO) crystal, and yttrium orthovanadate ($YVO_4$) crystal.

13. The apparatus as defined in claim 11, wherein said SHG and THG crystals are selected from the group consisting of beta-barium borate ($\beta$-BBO), lithium triborate (LBO), potassium titanyl phosphate (KDP), cesium triburate (CBO), and cesium lithium borate (CLBO).

14. The apparatus as defined in claim 11, wherein said SHG crystal and said THG crystal are rotatably mounted for tuning the wavelength of said SHG pulse ($2\omega$) and said THG pulse ($3\omega$).

15. The apparatus as defined in claim 11, further comprising a harmonic separation unit for separating said fundamental pulse ($\omega$), said SHG pulse ($2\omega$) and said THG pulse ($3\omega$).

16. The apparatus as defined in claim 11, further comprising at least one focus lens for compensating said fundamental pulse ($\omega$) having low input energy.

17. The apparatus as defined in claim 11, wherein said time plate crystal is selected from the group consisting of calcite crystal, quartz crystal, alpha-barium borate ($\alpha$-BBO) crystal, and yttrium orthovanadate ($YVO_4$) crystal.

18. The apparatus as defined in claim 11, wherein said SHG crystal is selected from the group consisting of beta-barium borate ($\alpha$-BBO), lithium triborate (LBO), potassium titanyl phosphate (KDP), cesium triburate (CBO), and cesium lithium borate (CLBO).

19. The apparatus as defined in claim 11, further comprising a detection unit for detecting said SHG signal ($2\omega$).

20. An autocorrelator for measuring a laser pulse having two polarization components $\omega_z$ and $\omega_x$ which are linearly polarized respectively along the Z-axis and the X-axis of a Cartesian coordinate system, the autocorrelator comprising:

a. a time delay unit further comprising at least one time plate made of a parallel flat birefringence crystal having a principal axis of refractive index $n_z$ parallel to its surface, and a principal axis of refractive index $n_x$ having an angle $\phi$ to its surface normal, and rotatably mounted such that its $n_z$ principal axis coincides with said Z-axis, and it is rotatable about its $n_z$ principal axis, for adjusting a time delay between said two polarization components $\omega_z$ and $\omega_x$ after they travel through the at least one time plate crystal, where the time delay is a function of an incident angle $\theta$ between said surface normal of said time plate crystal and the direction propagation of said two polarization components $\omega_z$ and $\omega_x$; and b. an autocorrelation unit further comprising at least one second harmonic generation (SHG) crystal for autocorrelation;

c. whereby a SHG signal ($2\omega$) can be generated for detection when said two polarization components $\omega_z$ and $\omega_x$ overlap each other in time which is controlled by said time delay, which is in turn generated and adjusted by said time delay unit.

* * * * *